Feb. 3, 1931.  C. V. FUQUA  1,791,354
CONTROL FOR GAUGE GLASSES
Filed Oct. 13, 1927
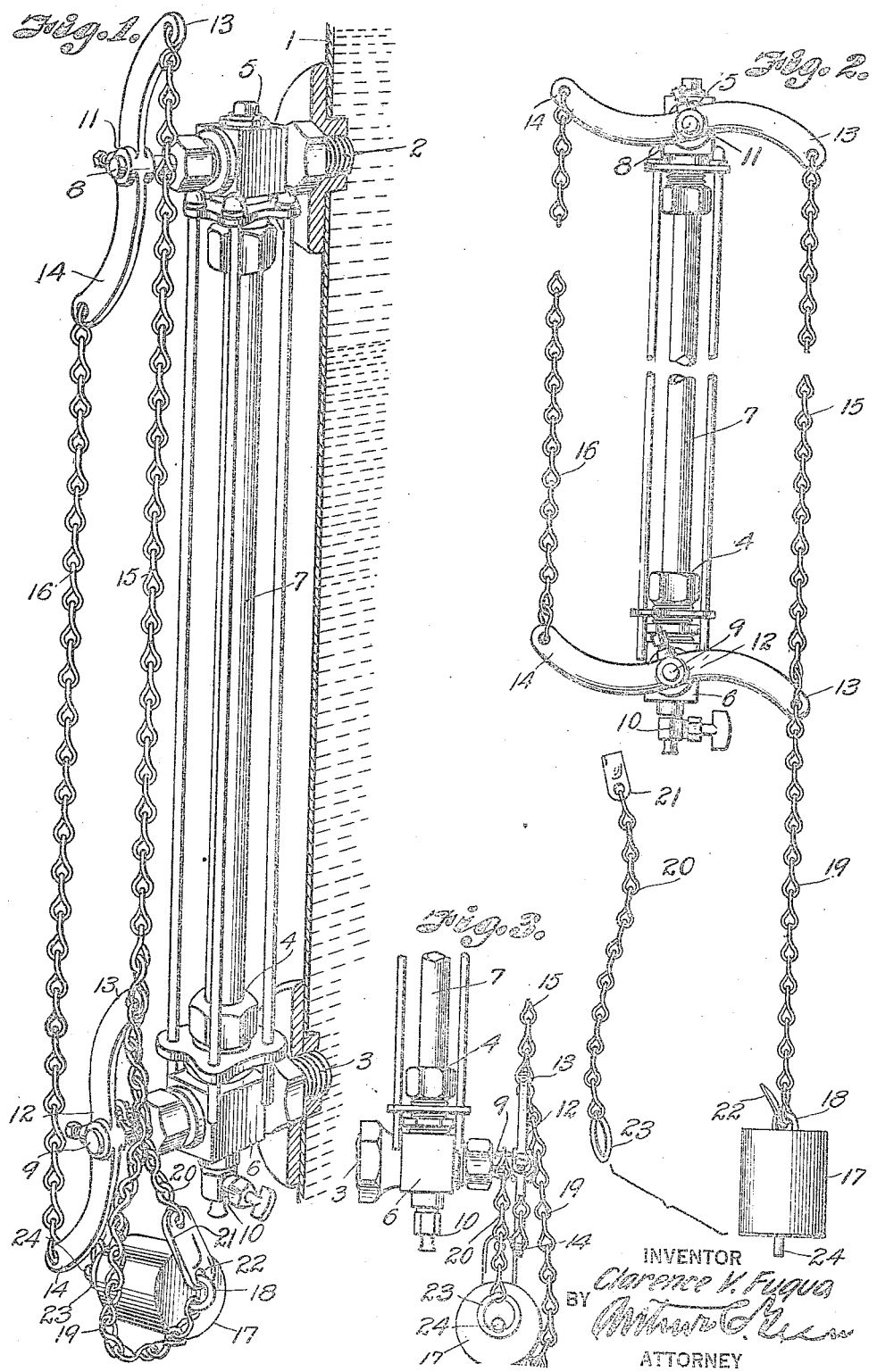

Patented Feb. 3, 1931

1,791,354

UNITED STATES PATENT OFFICE

CLARENCE V. FUQUA, OF KANSAS CITY, MISSOURI, ASSIGNOR TO THE CLEANERS EQUIPMENT CORPORATION, OF KANSAS CITY, MISSOURI, A CORPORATION OF MISSOURI

CONTROL FOR GAUGE GLASSES

Application filed October 13, 1927. Serial No. 225,983.

My invention relates to gauge glasses, its object being to provide for the automatic closing of the gauge glass valves in case of fire, and by means permitting the free manual actuation of the valves.

In accomplishing this object I have provided improved details of structure, the preferred forms of which are illustrated in the accompanying drawings, wherein:

Fig. 1 is a perspective view of a gauge glass installed on a vessel and having the valve-actuating mechanism of my invention.

Fig. 2 is a front view of valve portions of a gauge glass installation, showing the valve-closing members in functioning position and a fusible link member removed from position.

Fig. 3 is a side view of the valve-closing device and the lower portion of the gauge glass structure.

Referring in detail to the drawings:

1 designates the wall of a vessel in which the spaced nipples 2 and 3 of a gauge glass device 4 are positioned for disclosing the liquid conditions in the vessel. The gauge glass device is of ordinary construction, comprising the columns or valve housings 5 and 6 representing the valve means of admitting liquid from the vessel to the gauge glass, the glass tube 7 to which the liquid is admitted from the vessel for gauging, and the valve stems 8 and 9, the rotation of which actuates the valves represented by 5 and 6 for closing the housings and nipples to restrain the liquid from entrance into the glass column, or to admit liquid thereto. A drain valve 10 is provided in the bottom of the gauge glass device for draining the liquid from the tube 7. Ordinarily, wheels are secured to the outer ends of the stems for actuating the valves to close or open the ports into the gauge.

I provide upper lever 11 and lower lever 12 in the place of valve-actuating wheels, each lever having oppositely extending arms 13 and 14, the levers being secured to the valve stems of the upper and lower members of the gauge device.

I further provide chains 15 and 16 connecting respectively the arms or ends 13 and the ends 14 of the two levers whereby the rotation of one lever will cause the other lever to be similarly actuated and whereby such transfer of motion may occur with either clockwise or anti-clockwise rotation of a lever. One or the other lever may, therefore, be manually operated to close or open the valves and both ends of the glass gauge will be similarly influenced by the manipulation of either lever.

Means for automatically closing the ports into the glass gauge in case of fire, are further provided, comprising a weight 17 having a loop or hook 18 in one end whereby it is connected with the arm 13 of the lower lever 12 by a chain 19 so that when the weight is not otherwise supported, it will actuate the lever 12, and through it the lever 11, to close the valves and to hold the valves closed.

I provide as means for supporting the weight 17 in position to relieve the lever 12 and so permit the valves to remain open, a chain 20, to one end of which a fusible link 21 is connected, the fusible link having a portion 22 engaged with the loop 18 in one end of the weight 17. In the other end of the chain 20 is a ring 23 that may be loosely engaged with a pin 24 on the opposite end of the weight 17 from that which receives the fusible link. The chain 20 is arranged over the lower valve stem 9 for supporting the weight while the ring 23 engages the pin 24, the members being so disposed that the ring will support the weight and not slip from the pin when the elements are positioned for open condition of the valves. The chain 19 that connects the weight with the lever arm 13 of the lower lever 12 is of sufficient length so that the lever may be manually manipulated without disturbance of the safety device elements. The melting of the fusible link permits the link-supported end of the weight to drop so that the pin in the opposite end of the weight will slip out of the ring and permit the weight to fall to the limit of the chain and so to influence the arm 13 of the lever 12 downwardly.

In operation, the parts having been provided as described, the chain 19 is connected to the arm 13 of the lower lever 12, and the weight to which chain 20 is attached by the fusible link, is lifted to permit the ring end of the chain 20 to be looped over the lower valve stem 9; the weight is positioned with the pin 24 thereof engaged in the ring 23 of the link chain 20, said chain 20 being substantially centrally arranged on the valve stem so that the weight is balanced on its two end supports, namely, the fusible link and the ring. Should a fire occur and the fusible link be heated to approximately 165°, the link or its fusible portion melts and the link end of the weight falls, pulling the portions of the link apart; and the pin of the other end of the weight slips out of the ring so that the entire weight falls to the limit of the supporting chain 19. The falling and suspended weight, then influencing the arm 13 of the lever 12 downward, also through the chains 15 and 16 similarly actuates the lever 11, so that the valves at each end of the gauge glass device are closed to prevent access to the glass column by liquid in the vessel. The valves are thus closed automatically in case of fire to prevent escape and waste of liquid should the glass column be broken because of or during the fire.

While waste of a fluid which might escape through a gauge device in case of a column being broken, may be thus prevented, the invention is particularly designed for use on vessels containing highly volatile cleaning fluids, the escape of which through a broken gauge would increase the hazard of fire.

What I claim and desire to secure by Letters Patent is:

1. In combination with a gauge glass and valves at the ends of the glass having horizontal stems and vertically movable levers connected for actuating the stems in unison, a weight having flexible connection with one of the levers, and means including a fusible element having opposite ends connected with the weight for normally supporting the weight with slack in said flexible connection.

2. In combination with a gauge glass and valves at the ends of the glass having horizontal stems and vertically movable levers connected for actuating the stems in unison, a weight having flexible connection with one of the levers, and means including a fusible element having opposite ends connected with the weight for normally supporting the weight independently of the levers with slack in said flexible connection.

3. In combination with the actuating levers of gauge glass valve stems, means connecting the levers, a weight connected with one lever and means for supporting the weight comprising a chain, a fusible link connected with one end of the chain and connected with one end of the weight, a ring in the other end of the chain, and a pin in the other end of the weight, the chain being adapted for arrangement over the lower valve stem and engagement of its ring with the pin so that the pin of the weight will slip from the supporting ring when the link-supported end of the weight is released by melting of the link.

4. In combination with a valve, a valve support, a lever for operating the valve, and a weight connected with the lever, a fusible element secured to one end of the weight, and means including a member connected with the fusible element and having removable connection with the other end of the weight for supporting the weight.

In testimony whereof I affix my signature.

CLARENCE V. FUQUA.